United States Patent Office 2,768,089
Patented Oct. 23, 1956

2,768,089

CLAY SOIL IMPROVED BY AN ALKYLENE POLYAMINE

John G. Erickson, Minneapolis, Minn., assignor to General Mills, Inc., a corporation of Delaware No Drawing. Application October 13, 1952, Serial No. 314,571

7 Claims. (Cl. 106—287)

The invention relates to clay soils improved by adding small amounts of polyamines to such soils.

It is, therefore, an object of the present invention to provide improved clay soils by means of alkylene polyamines.

Several soil conditioners have been reported recently. Most of them are composed essentially of sodium polyacrylate. Another type is the salt of a copolymer of maleic acid and vinyl acetate. All of these soil conditioners, however, are polyanionic.

In contrast to these prior soil conditioners, the present soil conditioners are polycationic. They comprise the compounds containing two or more amine groups.

The effects produced by these polyamines vary with the nature of the polyamine. An important use of these compounds is for conditioning clay soil for agricultural purposes. The amine groups react with the soil particles and tend to bind individual particles into aggregates of larger size which no longer possess the colloidal properties of clay when wet. By employing polyamines which have appreciable solubility in water (5% or more based on the weight of the solution) it is found that the principal effect on clay soils is an improvement in the porosity and friability of the soils. At the same time, the soil is put into a condition in which it may be readily wetted. The polyamines are also useful for the stabilization of colloidal soils against erosion. A specific use of this type is the stabilization of a colloidal beach soil to prevent erosion and modify its characteristics to simulate a sand beach.

The invention also contemplates the use of polyamines which are less soluble than those referred to above, but which still are capable of reacting with the soil to affect its properties. Generally, these polyamines of lesser solubility are useful for other than agricultural purposes. They tend to waterproof the soil so that it is not easily wetted, and may be used in soil stabilization for road building and the like.

The polyamines which can be used in the present invention are of a wide variety. The term "polyamine" as used herein is intended to include compounds which include two or more amine groups. Any polyamine may be used which contains amine groups sufficiently basic to form an acetate salt. The nitrogen atoms of the polyamine can be separated by hydrocarbon groups such as methylene, ethylene, propylene and the like; aryl groups such as phenyl, tolyl and the like; or by groups containing hetero atoms such as oxygen, nitrogen or sulphur. The group intervening between the nitrogen atoms can be a straight or branched chain and can contain aromatic or heterocyclic nuclei. In polyamines containing more than two amine groups, the groups intervening between the various nitrogen atoms can be alike or different.

Primary, secondary and tertiary amines can be used. A wide variety of substituents can be present on the nitrogen atoms. These include simple alkyl groups such as methyl, ethyl, propyl, dodecyl, octadecyl, substituted alkyl groups such as hydroxyethyl and the like, aryl or heterocyclic groups such as phenyl, tolyl, thienyl, pyridyl and the like. Similarly, the nitrogen atom of the amine group can be part of a heterocyclic ring as in the case of some of the compounds listed hereinafter. The list appearing below includes polyamines which can be used in the present invention. This list includes complete compounds, as well as groups which contain a plurality of amine groups. The compounds derived from these groups may be monomeric, in which case the remaining valences can be satisfied by hydrogen or some other group, or the compound may be polymeric, containing a number of the indicated recurring groups. In addition, the polyamine may be employed either in the form of the free amine or in the form of a fully neutralized salt. Furthermore, some of the amine groups may be in the form of salts and other amine groups in the same compound may be free amines. Typical acids which can be used to form the salt include formic, acetic, hydrochloric, nitric, phosphoric and the like.

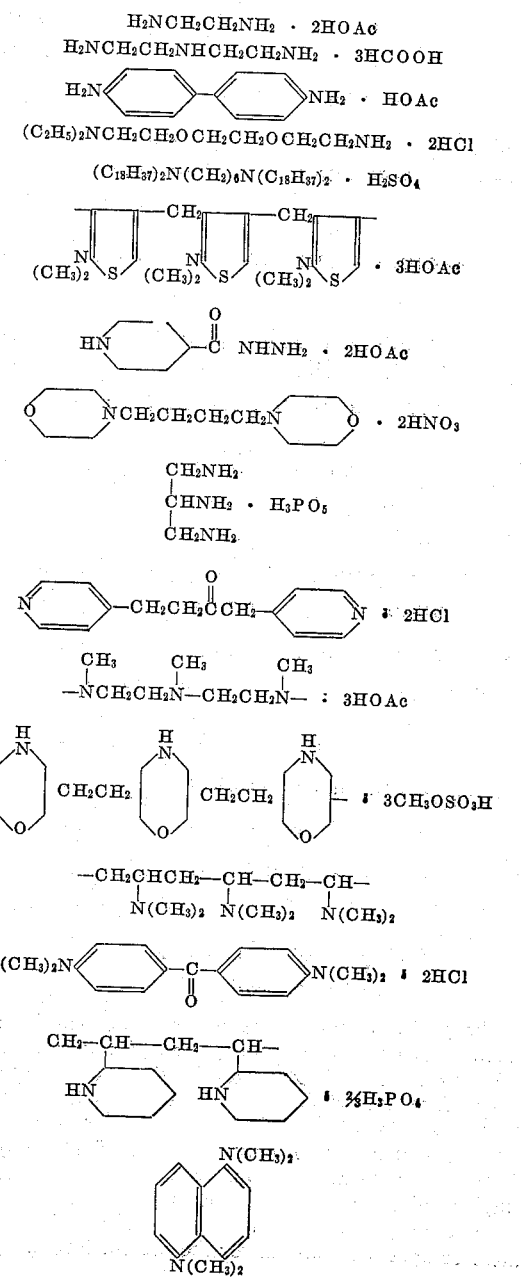

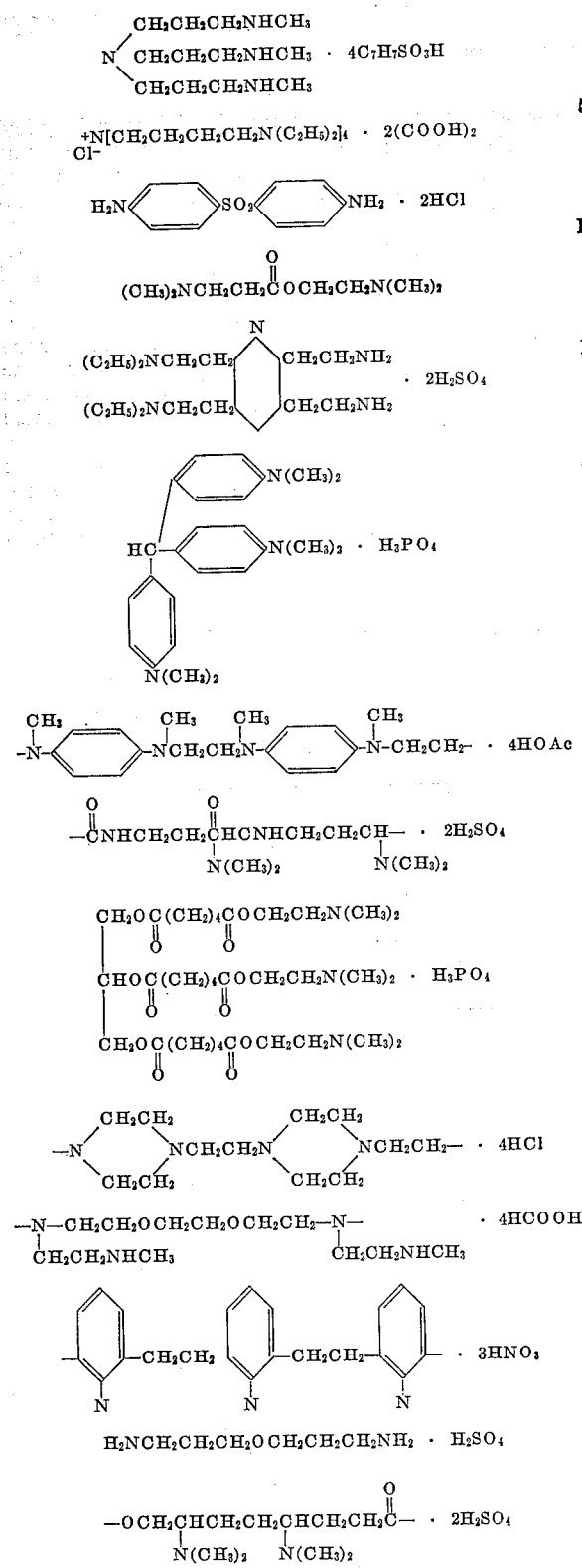

The preferred polyamines are those derived from the alkenes, such as ethylene, propylene and butylene. These polyamines are prepared by reacting the alkenes with halogen to form the dihalide which is then reacted with ammonia. In the latter reaction, a mixture of reaction products is obtained. For example, in the reaction of ethylene dichloride with ammonia, the reaction mixture contains ethylene diamine, diethylene triamine, triethylene tetramine, tetraethylene pentamine and so forth. Each of these compounds is useful for the present invention, and for economic reasons it is preferred to employ the crude reaction mixture for treating the soil rather than the more costly isolated individual polyamines. There is no apparent limit to the number of recurring units in a polyamine of this type which is useful for the present invention. Each amine group is available for reaction with the soil, and each contributes to the water solubility of the compound. These preferred polyamines have the following recurring group:

$$-NHCHCH_2-$$
$$\quad\; |$$
$$\quad\; R$$

in which R is methyl or ethyl.

The treatment of the soil with these polyamines may be effected in either of two ways. The polyamines may be stirred as a dry powder into the dry soil. Addition of water then brings about the reaction with the soil. The other method involves the addition of the polyamine to the soil in the form of a water solution. Where the polyamines have limited solubility, it is preferred to add them to the soil other than in the form of an aqueous solution. Even though these compounds have limited solubility, they remain in the soil and gradually dissolve and react with the soil particles as the molecules of the polyamine in solution in the soil are gradually removed by reaction with the soil. Accordingly, it is possible to employ polyamines with very low degrees of solubility, even lower than 1/10 of 1%.

The polyamino compound may be used in very small amounts, usually from 0.05–0.5% based on the weight of the soil. However, even smaller quantities produce some desirable results, and it is apparent that even larger amounts may be used. Usually, however, it is not necessary to use a quantity in excess of 1%.

*Example 1*

A solution of 0.5 part of diethylenetriamine in water was poured onto 100 parts of crushed dry clay soil. After this mixture had dried, it was easily crumbled between the fingers and absorbed water very rapidly.

A sample of the same clay soil was wet thoroughly with water, no conditioner being added. After drying, it was a very hard mass which did not absorb water very rapidly.

*Example 2*

A solution of 0.5 part of ethylenediamine in water was poured onto 100 parts of crushed dry clay soil. After this mixture had dried, it was a very friable, porous soil.

*Example 3*

A solution of 0.5 part of triethylenetetramine tetra-acetate in water was poured onto crushed dry clay soil. After this mixture had dried, it was an easily crumbled material which soaked up water readily.

*Example 4*

A solution of 0.1 part of the dihydrochloride of 1,3-diaminobutane in water was poured onto crushed dry clay soil. When this mixture was dry, it possessed excellent qualities of friability and porosity.

For purposes of comparison, two samples of the same soil used for the above examples were treated with a salt of a copolymer of maleic acid and vinyl acetate (a polyanionic soil conditioner now on the market). In one sample 0.1% by weight of the conditioner was used; in the other, 0.5%. Both were wet with water and allowed to dry. While in each case the treated soil absorbed water rapidly, the soil after drying was very hard.

I claim as my invention:
1. Clay soil conditioned with an alkylene polyamine.
2. Clay soil conditioned with a polyalkylenepolyamine.
3. Clay soil conditioned with the mixture of reaction products of ethylene dichloride and ammonia.

4. Clay soil conditioned with diethylenetriamine.
5. Clay soil conditioned with ethylenediamine.
6. Clay soil conditioned with triethylenetetramine.
7. Clay soil conditioned with tetraethylenepentamine.

References Cited in the file of this patent

UNITED STATES PATENTS

| | | |
|---|---|---|
| 2,323,928 | Miller | July 23, 1943 |
| 2,378,235 | Miles | June 12, 1945 |
| 2,436,694 | Read et al. | July 9, 1946 |
| 2,508,924 | Mertens | May 23, 1950 |
| 2,534,713 | Hankin | Dec. 19, 1950 |

FOREIGN PATENTS

| | | |
|---|---|---|
| 578,694 | Great Britain | July 9, 1946 |